June 15, 1926.

E. D. TILLYER

OPHTHALMIC LENS

Filed May 28, 1924

INVENTOR
Edgar D. Tillyer.
BY
Harry H. Styll
ATTORNEY

June 15, 1926.

E. D. TILLYER

OPHTHALMIC LENS

Filed May 28, 1924  4 Sheets-Sheet 2

INVENTOR
Edgar D. Tillyer.
BY
Harry H. Styll
ATTORNEY

June 15, 1926.

E. D. TILLYER

OPHTHALMIC LENS

Filed May 28, 1924  4 Sheets-Sheet 3

Inventor

Edgar D. Tillyer.

By Harry H. Styll.

Attorney

June 15, 1926.

E. D. TILLYER 1,588,559

OPHTHALMIC LENS

Filed May 28, 1924    4 Sheets-Sheet 4

*Fig.10.*

Inventor

Edgar D. Tillyer.

By Harry H. Styll.

Attorney

Patented June 15, 1926.

1,588,559

UNITED STATES PATENT OFFICE.

EDGAR D. TILLYER, OF SOUTHBRIDGE, MASSACHUSETTS, ASSIGNOR TO AMERICAN OPTICAL COMPANY, OF SOUTHBRIDGE, MASSACHUSETTS, A VOLUNTARY ASSOCIATION OF MASSACHUSETTS.

OPHTHALMIC LENS.

Application filed May 28, 1924. Serial No. 716,411.

This invention relates to improvements in ophthalmic lenses, and has particular reference to an improved construction of lens to reduce the marginal or oblique errors to a minimum to obtain the best possible vision throughout the normal field of vision. It relates further to an improved series of ophthalmic lenses.

One of the leading objects of the invention is the making of an ophthalmic lens with a shape surface that will reduce to a minimum the marginal or oblique errors of focus and astigmatism for the lens when combined with a second surface to produce the required power, said surface being of the spherical, plano, toric, or cylindrical type usual in lens manufacture.

Another object of the invention is the production of a series of ophthalmic lenses of several proximate powers, all of which will have the same shape surface, and oblique errors reduced within a permissible limit.

Another object of the invention is the provision of a series of ophthalmic lenses with oblique errors reduced to a minimum permissible to good usage where several lenses of different powers, some proximate and others separated in the range of powers from lowest to highest, which will have the same shape surface on one side, and wherein the surfaces on the other side are used for several different powers of lenses, thereby reducing the number of surfacing tools and equipment to a minimum, saving time, expense, investment and insuring prompt service, and permitting the lenses to be sold if desired as blanks, that is, one side only finished, leaving the other side to be put on by the optician to fit the individual prescription.

Another object of the invention is to produce such lenses and series of lenses with improved mean marginal errors of focus and astigmatism.

Another object of the invention is to provide means to determine the best possible shape surface to produce the smallest marginal errors.

Another object of the invention is to provide graphic means whereby the marginal errors and the best shape surfaces may be readily visualized and determined for lenses throughout the whole range of ophthalmic lenses.

Another object is to reduce the cost of production of such marginally corrected lenses, put them on a manufacturing basis, and on a service basis parallel with the usual non-corrected prior art lenses, and to produce the same with a minimum of equipment and tools.

Other objects and advantages of the invention will be readily apparent by reference to the following specifications taken in connection with the accompanying drawings, and it will be understood that modifications in or departures from the specific features herein disclosed within the scope of the appended claims may be made without departing from or exceeding the spirit of the invention, the preferred forms being shown only by way of illustration.

Referring to the drawings.

Figure 1:
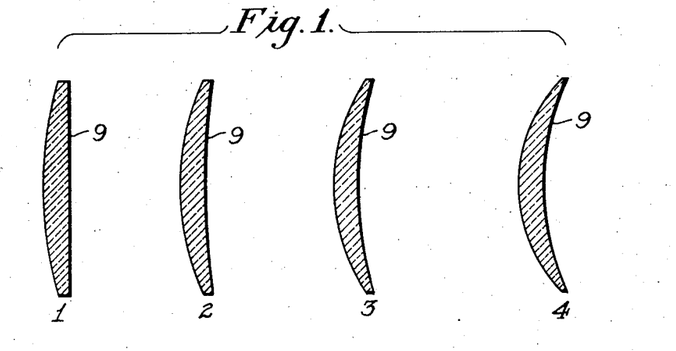
Figure 1 is a diagrammatic illustration of four cross sections of different shapes of the same power positive or plus lenses numbering respectively 1, 2, 3 and 4.
Figure 2:
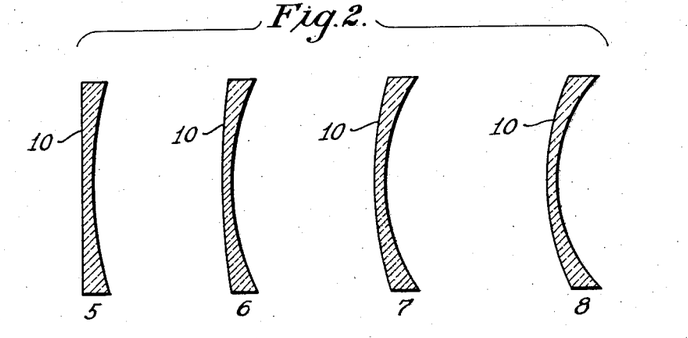
Figure 2 is a diagrammatic illustration of four cross sections of different shapes of the same power negative or minus lenses, numbered respectively 5, 6, 7 and 8.

It is well known in the art that a lens of given power may have many different shapes, the power of the lens depending upon the relationship of the surfaces on the two sides and the refractive lens media on which these surfaces are placed, as for example, in Figure 1, four diagrammatic views of lenses of the same power are shown, the lenses being plus or positive lenses. It will be noted that lens number 1 has one side plano and is flat in general appearance, while lens number 4 is very bulging. In Figure 2, four negative lenses of equal power are diagrammatically shown, number 5 having one side plano and having a flat appearance, and number 8 again being very bulging.

It is also well known in the art that the power of a lens at its axis or central point is very different from the power in the marginal portions of the lens due to oblique errors both of focus and astigmatism.

It is apparent from an inspection of Figures 1 and 2 that one of the surfaces dominates the shape of the lens; that is to say, gives the lens its appearance. In Figure 1 the right hand surface 9 is the dominant one, and in Figure 2 the left hand surface 10 is the dominant one. This dominant surface I designate as the shape surface.

It is also well known that the marginal errors are greater with some shapes than with others. The important factor therefore, of my invention is the provision of means to determine the best shape surface from the marginal or oblique errors, as they are termed in the art, so that the said errors both of focus and astigmatism, or either, may be reduced to best possible advantage obtainable in a lens of that power, keeping in mind at the same time the commercial production of the various powers of lenses, so that the same shape surface may be used for as many different power lenses as possible within permissible limits of marginal error.

I first determine the center thickness of my lens in the manner well known to the prior art, working from a desired edge thickness and within the limits of mechanical strength necessary.

Figure 3:
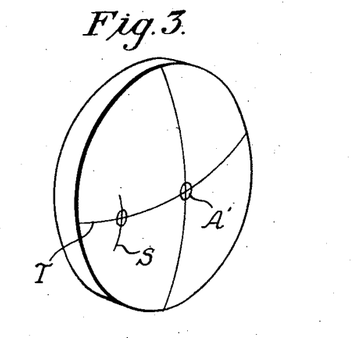
Figure 3 is a diagrammatic representation of a spherical lens showing the axial power and a marginal point through which the oblique or marginal errors are computed.
Figure 4:
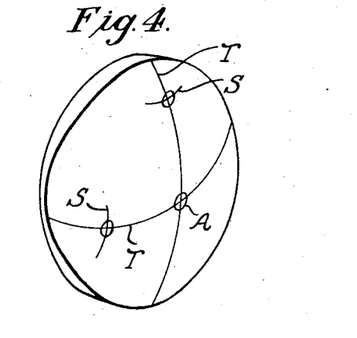
Figure 4 is a diagrammatic representation of a toric lens showing the axial power point and two marginal points in the major meridian through which the oblique or marginal errors are computed.
Figures 5, 6:
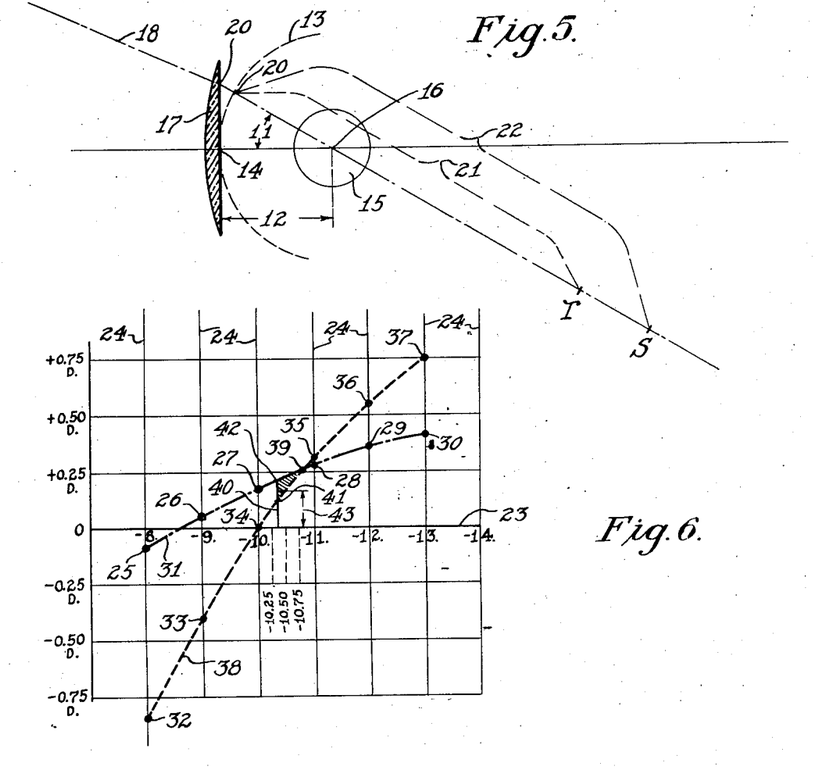
Figure 5 is a diagrammatic representation of a parallel ray of light coming from a distant point, through the marginal point of a lens into the eye, showing the focal points in the two meridians S and T.
Figure 6 is a graph chart showing marginal errors in power for both tangential and sagittal planes for different shape minus 8.00 diopter power lenses and the shape surfaces obtainable with permissible marginal errors.

The normal angle of vision is generally considered to be 60 degrees, 30 degrees on each side of the axis, see angle 11, Figure 5. The surface of the lens on the eye side is usually considered to be worn at a distance of 27 millimeters from the center of the eye, see distance 12, Figure 5. My determinations, therefore, for marginal errors are taken at a point 30 degrees out from the axis of the lens, for a lens positioned 27 millimeters in front of the center of the eye, Figure 3 showing the one point of determination for a spherical lens, and Figure 4 showing the two points of determination for a toric lens, that is, a lens having a different curvature in the two major meridians. The computations are made on two planes at right angles to each other at the marginal points, the plane marked S being termed in the art the sagittal plane, and the plane marked T, the tangential plane.

The procedure of this computation is as follows:

Using the center thickness as determined above, compute by the usual trigonometrical lens computation as set out in standard text books on optics, which have been published for fifty years or more. See particularly "Gleichen's Lehrbuch der Geometrician Optik" a number of lenses of different shapes for a given power—see Figure 1—as for example a minus 8.00 dioptre lens, assuming the rays to pass through the lens at a point determined so that they make a given angle (usual 30°) with the axis of the lens, and intersect the axis at a given distance from the rear surface, in this case 27 millimeters, making said computations both in the tangential and sagittal planes for one point in a spherical lens, and for two points in a toric lens. It has been customary to refer the results to the eye side surface of the lens, but I use the curve 13, Figure 5, as it keeps the distance from the cornea constant, this curve 13 being a sphere with its center at the center of rotation of the eye, and tangent to the lens at the axis 14, see Figure 5.

In Figure 5, 15 represents the eye, 16 the center of rotation of the eye, 17 the lens before the eye, 18 the entrant parallel ray from a distant point, the point S, the point where the ray is focused in the sagittal plane, and the point T the point where the rays are focused in the tangential plane, the distance to the point S and to the point T being measured from the curve 13 from the point 19 and not from the lens surface at the point 20. The distance 21 from the point 19 to the point T is the tangential focus, and the distance 22 from 19 to S is the sagittal focus.

Having computed the tangential and sagittal powers for the marginal points of several different shape lenses of the same power, in this case a minus 8.00 dioptre lens, I proceed to make a graphic chart of the sagittal and tangential results so found, see Figure 6. I first lay off a datum line 23; at equidistant points on this line I erect perpendicular lines 24. The points on the line 23 represent shape functions, and in this instance are marked from left to right minus 8.00, minus 9.00, minus 10.00, minus 11.00, minus 12.00, minus 13.00, and minus 14.00. The vertical lines 24 represent errors in marginal power and are vertically subdivided in equal spaces reading from the line 23 upwards, plus 0.25, plus 0.50, plus 0.75, etc. This vertical scale is the scale of the errors in power determined by my sagittal and tangential computations. I next proceed to lay off on the vertical lines the sagittal results I have computed, using the vertical scale as a unit, as for instance I mark off the S result on line minus 8.00, being the point 25. The points 26, 27, 28, 29, and 30 are similarly laid off on their corresponding lines. Then I draw a curve 31 through the points 25 to 30 inclusive, which gives me the sagittal error curve for my minus 8.00 dioptre lens. I next proceed to lay off my tangential error curve in the same way, locating the points 32, 33, 34, 35, 36, and 37 and draw the tangential error curve 38 through them.

It will be noted that the two curves 31 and 38 cross each other at 39; this is the point of no astigmatic variation from central power. The space between the two lines 31 and 38 graphically shows the amount of marginal astigmatic variation, and may be scaled off in units of the vertical scale. I next draw the vertical line 40, the position of this line being fixed by the distance between the points 41 and 42, which represents the greatest astigmatic error I am willing to accept for my lenses, in this case about 0.10 dioptres as measured on the vertical scale. The cross sectioned space between the points 39, 42, and 41, then represents graphically the marginal astigmatic variation that may be scaled off. The distance 43 which extends from the line 23 to a point half way between points 41 and 42 is the mean focal or spherical variation from central power for my minus 8.00 dioptre lens. The focal variation is the distance from its base line 23 to a point midway between the two curves 31 and 38, measured on a vertical line. To obtain the shape curve then for my minus 8.00 dioptre lens, it is only necessary to drop a line 40 from a point, in this case point 42, to the base line 23, and scale off the reading on the line 23 from the nearest vertical line to plus 0.25, or in this case about plus 0.125 which will give me a minus 8.00 dioptre lens with about 0.125 dioptre marginal astigmatic variation (distance between 41 and 42) and about 0.17 dioptre marginal focal variation (distance 43). It will be seen that while the astigmatic variation at point 39 is zero, the focal variation is about 0.25, from which it also will be seen that I can visually shift my line 40 to average up to focal and astigmatic variations without further calculations, and obtain my shape surface by the point of intersection of the base line and the vertical line through the point of selected oblique error.

It is well known in the art that commercial ophthalmic lenses are made in series varying in central or axial power from the lowest to the highest by a constant increase in power; as for instance, the lenses will vary at the center by one-eighth or one quarter dioptre in the lower portion of the range, by one-half dioptres higher up, and for very strong lenses by even a whole dioptre. It is also well known in the art that the marginal powers of commercial lenses vary greatly beyond these limits from the central powers of said lenses.

I have found, however, that I can produce lenses with my shape curves having considerably less marginal variations than proximate lenses in the ophthalmic series vary from each other, although my variations will increase in amount for the stronger lenses just as the difference in proximate lenses in the ophthalmic series increase for the stronger lenses. The reason for this is that the poorer the eye, the stronger the lens, and vice versa; hence an eye requiring a strong lens will not distinguish small differences as readily as an eye requiring a weak lens. I, therefore fix on a maximum amount of astigmatic variation I am willing to subject the eye to at the various portions of the series, and then increase the astigmatic variation from no astigmatic variation to an amount equal to or less than the maximum astigmatic variation, and reduce the focal variation accordingly. It will be understood that the maximum variation is a variable, as explained below, depending on the character of the lens, and the position of the lens in the ophthalmic series; in some places it is $\frac{1}{16}$ dioptre, in some $\frac{1}{8}$, in some $\frac{1}{4}$, in some $\frac{3}{8}$, and so on, as set forth in the series below. It will also be understood that the focal variation is the spherical variation from the spherical central power of the lens. An inspection of the graph chart will show that at the point of no astigmatic variation, the focal variation is always greater than at a point between the base line of the chart and the point of no astigmatic variation. I always take my shape curve between these points, and in so doing produce a lens different from any prior art lens that I am familiar with, most of which take their shape curves for the point of no astigmatic variation, or for the point of no astigmatic variation, if the variation of focus is equal to or less than the difference of proximate lenses in the ophthalmic series for a lens of that power. None of them, so far as I am aware, increases the astigmatic variation for lenses where the focal variation is within the difference of proximate lenses of the series. I have proceeded on a different principle by setting up a maximum astigmatic variation, less than the difference of proximate lenses of the series, and less than will be noticeable to the eye and introducing the variation into the lens to cut down the focal variation, even where it is less than that of the difference of proximate lenses in the series, thereby obtaining the best effective vision and consequently superior lenses. I deliberately introduce an astigmatic variation of negligible effect on the eye to reduce the focal variation.

In my series of lenses, the approximate value of the marginal astigmatic variation is—

Spherical lenses.

Zero to plus 2.25, 1/16 diopter.
Plus 2.25 to plus 7, 1/8 diopter.
Zero to minus 2.25, 1/16 diopter.
Minus 2.25 to minus 20, 1/8 diopter.

Spherical power combined with minus 1 cylinder power or less.

Zero to plus 3.00 diopters, 1/8 diopter.
Plus 3 to plus 7 diopters, 1/4 diopter.
Zero to minus 20 diopters, 1/8 diopter.

Spherical power combined with cylinders between minus 1 and minus 2.

Zero to plus 3 diopters, 1/8 diopter.
Plus 3 to plus 7 diopters, 1/4 diopter.
Zero to minus 2.25 diopters, 1/8 diopter.
Minus 2.25 to minus 16 diopters, 1/4 diopter.
Minus 16 diopters up, 3/8 diopter.

Spherical power combined with cylinders between minus 2 and minus 4.

Zero to plus 7 diopters, 1/4 diopter.
Zero to minus 5 diopters, 1/4 diopter.
Minus 5 to minus 13 diopters, 3/8 diopter.
Minus 13 to minus 16 diopters, 1/2 diopter.

Spherical power combined with cylinders between minus 4 and minus 6.

Zero to plus 2 diopters, 1/4 diopter.
Plus 2 to plus 7 diopters, 3/8 diopter.
Zero to minus 4 diopters, 1/4 diopter.
Minus 4 to minus 6 diopters, 3/8 diopter.
Minus 6 to minus 13 diopters, 1/2 diopter.

By comparing the value of the astigmatic variation with the differences of proximate lenses in the ophthalmic series, it will be seen that the variation is very much smaller than the differences of proximate lenses in the series. With the introduction of an amount of astigmatic variation which is not injurious to the eye, the focal variations have been greatly improved, and hence the whole vision of the lens.

Figure 8:
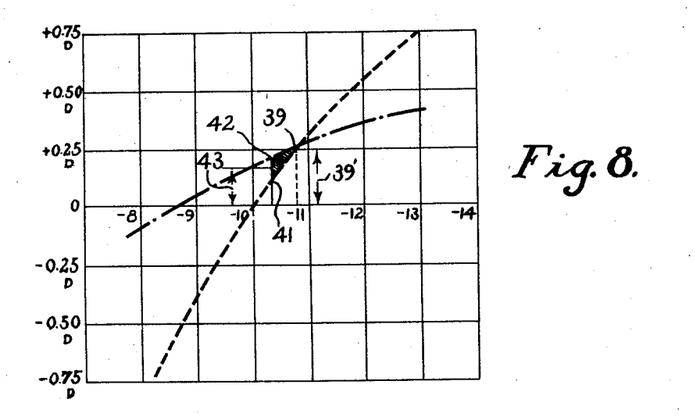
Figure 8 is the same as Figure 6, with some of the data removed for sake of clearness in explanation.

Referring now to Figure 8, which is the same as Figure 6, with considerable of the data removed for sake of clearness in explanation, the point 39 is the point of no astigmatic variation from the central power of the lens for a composite of several shape curves for the same power. The focal variation from central power, however, is the distance from the axis line to the point 39, in this case about one quarter of a dioptre, and is indicated by the distance 39'; hence if I took a shape curve passing through the point 39, I would have a lens having no astigmatic variation, but one quarter of a dioptre focal variation. If, however, I move down the curve towards the axis line from the point 39 to the point 42, I introduce about 1/8 of a dioptre of astigmatic variation, i. e., the distance between the points 41 and 42, but I reduce the focal variation from 1/4 dioptre to about 3/16ths of a dioptre, i. e., the distance 43, which is midway between the points 41 and 42; hence by introducing 1/8 dioptre of astigmatic variation I reduce the focal variation by 1/16th dioptre and I have a lens with 1/8 dioptre astigmatic variation, and 3/16 dioptre focal variation, which is a much better lens visually than a lens with a shape curve taken at the point 39, the point of no astigmatic variation. The shape curve through the point 39 would be about a 10.75 dioptre curve, while the shape curve through the point 42 would be about a 10.40 dioptre curve. In other words, a 10.40 shape curve would give me the best possible lens for variations of both focus and astigmatism, the variations from central power being balanced to the point of highest efficiency for the lens as a whole. In previous prior art lenses the shape curve has either been taken at the point 39, the point of no astigmatic variation, ignoring the focal variation altogether, or the focal variation has only been altered when it exceeded the difference in power between proximate lenses of the ophthalmic series at the point in the series where the lens of required power happened to come, and then only to an amount to bring it below this difference in power. In other words, the point of no astigmatic variation was never departed from if the focal variation was within the limit of difference between proximate lenses of the series at the required point, and then only enough to bring the focal variation within that limit, while in my lenses I always proportion the two variations to the best position for maximum visual efficiency. As for instance, the point 39 in the lens of Figure 8, would give a lens within the required limits without altering the focal variation, and would have been used in prior art lenses, but I have proportioned the two to balance the variations even where the focal variation was below the difference in power of proximate lenses in the series.

The lens of this example is a minus 8 lens, and it will be noted from the first paragraph of page 15, of the specification herein, that an 8 dioptre lens will vary from its next neighbor in the ophthalmic series by one-half a dioptre, yet I have corrected my lens to a variation of three-sixteenths dioptre for focus and one-eighth dioptre for astigmatism. In the prior art lenses and in the lens of Patent No. 1,315,667, September 9, 1919, of which I was a joint inventor, no correction would have been made, as the focal variation was only one quarter dioptre, while the permissible variation as reasoned at that time was one-half dioptre. With my present lenses much better visual effects are obtained and all the error possible removed.

Figure 9:
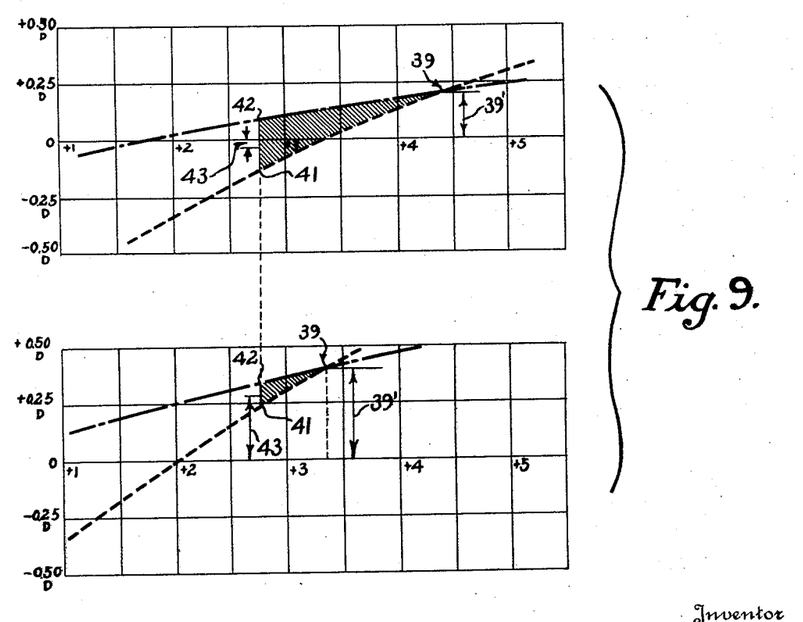
Figure 9 is the same as Figure 8, except that curves for the two points of a toric, or lens having different powers in two major meridians, are shown.

Figure 9 shows the two curves of a toric lens of minus 5 spherical power combined with a minus 3 cylinder, one curve for each meridian, the points being taken at right angles to each other, i. e., one on the horizontal axis and one on the vertical axis, the points being in the margin at the edge of the field of vision. These curves are plotted in exactly the same way that the curve of Figure 8 is plotted. The point 39 is the point of no astigmatic variation for a composite of several shapes of lenses of the same power taken in the two meridians. In the upper curve this point 39 falls at about 4.40 dioptres; in the lower curve at about 2.75 dioptres. The focal variation of the upper curve 39' is about 0.2 dioptres, while in the lower curve it is about 0.4 dioptres, almost one-half a dioptre. Now, I find if I move down the curve of the upper figure to the point 42, i. e., about 2.75 dioptres, I have practically no focal variation and about one quarter dioptre astigmatic variation, while if I move down the lower curve from 39 to 42, I have only about one quarter dioptre focal variation and only about ⅛th dioptre astigmatic variation; hence if I take a shape curve of 2.75 dioptres, my maximum variation at any point is one quarter dioptre focal variation and one quarter dioptre astigmatic variation, which will give me the maximum visual efficiency in both meridians for a lens of that power. The procedure is identical with that of Figure 8, only I have considered the two points of a toric lens, or a lens having different powers in the two meridians. In the case of this lens I find also that my corrections are well below the difference between proximate lenses at the requisite part of the series. In prior art lenses a shape curve would have been taken at 3.30 dioptres, the point of no astigmatic variation of the lower figure, which would be a good lens, except that in one meridian there would be a focal error of 0.4 dioptres, nearly one-half dioptre, whereas in my lens the greatest variation is one-quarter dioptre in any meridian.

Figure 10:
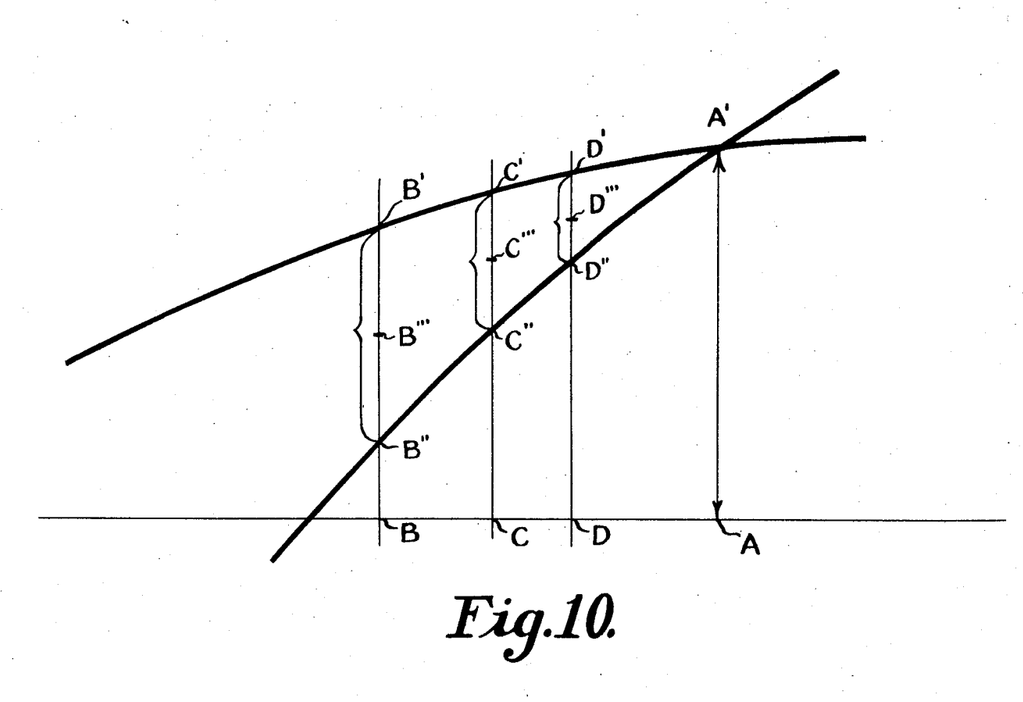
Figure 10 is a diagrammatic chart showing the positions of the shape curves for no marginal astigmatic variation, maximum marginal focal variation, and the lens of the invention.

Figure 10 is a diagrammatic chart illustrating the position of the shape curve for the lens of the invention. The two curves intersect each other at the point A', which is the point of no astigmatism. The distance A A' is the focal variation from the central power of the lens having no astigmatic variation, the curves having been plotted from several shapes of the same power lens. The line B B' indicates the position of a shape curve having the maximum amount of marginal astigmatic variation, which I am willing to introduce into the lens. This marginal astigmatic variation is the distance B'' B', and it is less than the difference between proximate lenses in the ophthalmic series for a lens of similar power. The distance B B''' is the marginal focal variation for the lens having the shape curve BB'. The line D D' shows the position of the shape curve having the maximum amount of marginal focal variation that I am willing to introduce into the lens. This marginal focal variation is represented by the distance D D'' '. The distance D''—D' is the marginal astigmatic variation for the lens at this point. Now, my lens will fall between the shapes B B' and D D' and is indicated by the line C C'. The distance C C''' represents the marginal focal variation of my lens and the distance C' C'' indicates the marginal astigmatic variation of my lens, from which it will be noted that my lens has a larger marginal variation of astigmatism than the lens with the shape curve A A', but it has a much smaller marginal focal variation than the lens having a shape curve A A', and also that its marginal astigmatic variation is less than the maximum for the lens with a shape curve B B', and that the marginal focal variation is less than the maximum focal variation for a lens having a shape curve D D'. In other words, my lens will have a shape curve which falls between the maximum amount of allowable astigmatic focal variation and the maximum amount of allowable marginal focal variation which so far as I know produces a lens having very different optical properties from any prior art lenses.

While Figure 6 shows only one power of lens, namely minus 8.00 dioptres, by way of example it is clear that I can make similar plots for all of the powers of the practicable range of lens powers. It would be confusing if all of these curves were shown in the drawing, and the one illustrates the principle involved.

Figure 7:
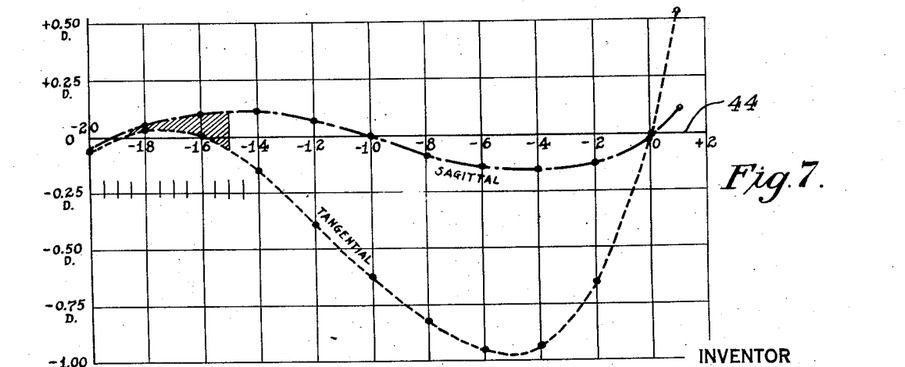
Figure 7 is a graph chart showing marginal errors in lenses from 0.00 to minus 20.00 diopters power for one definite shape surface which is plano in this case, showing the ranges in power for which this shape surface can be used to give a lens within the permissible marginal errors.

While I have shown in Figure 6 how the best shape surface may be obtained for a given power lens with minimum marginal variations, I have shown graphically in Figure 7 how many powers of lenses may be obtained with minimum marginal focal variations for a given shape curve; as for instance, I have shown that a plano shape surface cannot be used for a minus 8.00 dioptre lens, but that it is a very good shape from minus 15.00 to minus 20—see shaded portion.

In Figure 7, I have laid off a base line 44, equally subdivided and marked from right to left plus 2.00, 0.00, minus 2.00, minus 4.00, minus 6.00, up to minus 20.00 by steps of 2.00. Through these points I have erected perpendiculars and scaled them vertically plus one quarter and plus one half above the line 44, and minus one quarter, minus one half, minus three quarters, and minus one below the line by equal spacing. Next I have plotted the sagittal and tangential residuals for a plano shape surface for the various powers, and drawn the S and T curves through these points. As in the graph, Figure 6, the space between the curves shows the oblique variations of focus and astigmatism and that portion of this space which has been cross hatched indicates the section or zone in which lenses with good marginal fields can be made with plano shape surfaces, with oblique errors of less than one quarter dioptre, say the following minus lenses differing in power by one quarter dioptre, 15.00, 15.25, 15.50, 15.75, 16.00, 16.25, 16.75, 17.00, 17.25, 17.50, 17.75, 18.00, 18.25, 18.50, 18.75, 19.00, 19.25, 19.50, 19.75, and 20.00, or twenty different powers. The other shape curves will be plotted in the same way on the graph, hence the oblique variations will be at once apparent for all powers of lenses of the range to be made for the various shape curves. This graph shows the following lens characteristics at a glance:

Oblique variations for all powers of lenses; oblique variations for the various shape curves for all powers of lenses; the number of different power lenses a single shape curve with good marginal vision can be used for, for both proximate powers and separated powers in the range; the best marginal vision that can be obtained for a single lens; the largest series of lenses of different power that can be made with a single shape surface; the best shape surface for any power of lens desired; the minimum number of shape surfaces with good marginal vision that can be used for the whole range of powers.

The results of this process of making lenses is to reduce to a minimum the number of tools required to make the whole range of lenses, because a minimum number of shape surfaces are used; a minimum of investment in equipment and stock for the prescription optician, a maximum speed of filling prescriptions, economy in production and cost of distribution. With this process the manufacturer can supply the prescription optician either lenses finished on both sides, or blanks finished on one side, allowing the prescription optician to finish the second side of the blank with tools furnished by the manufacturer; hence prescriptions can be filled as readily as with ordinary uncorrected lenses and with the same procedure.

In the case of semi-finished lenses, I furnish the prescription opticians with a chart or tabulation, which tells him exactly what thickness to finish the lens to, and it is very important that this dimension should be adhered to. Since the surface curvatures for the various powers have been selected and calculated for certain thickness, it is obvious that to increase the thickness would be to increase the marginal errors. All lenses of the same spherical power have the same thickness, and as the power increases, the thickness increases, regardless of the amount of cylinder in the lens. While the thickness of adjacent lenses in the series differs, it is a fixed amount for every lens of a certain power, and from consideration of which the most suitable shape curve and second-side curve have been selected.

As illustrating a series or range of commercial ophthalmic lenses, the following schedule taken from the price list of one of the largest lens manufacturers is set out:

In the spherical range the lenses increase from 0.12 to 0.75 by ⅛ steps; from 0.75 to 6.00 by ¼ steps; from 6.00 to 11.00 by ½ steps; from 11.00 to 16.00 by a whole dioptre step, and from 16.00 to 20.00 by two whole dioptre steps.

In the cylinder and toric range the steps are one-eighth from 0.12 to 1.75, one quarter from 1.75 to 6.00; one-half from 6.00 to 8.00 dioptres.

In the case of toric surfaces on lenses as is well known in the art, the necessity for marginal correction is greater than with spheres and my process is particularly useful, because of the fact that in such lenses, the radius of curvature approaches either zero or infinity in one plane as a radius though the point considered becomes a greater angular distance from the axis of the lens.

I have found that with my invention I can regulate the marginal variations to an amount less than the neighboring or proximate lenses in the range series vary from each other at any part of the range; i. e., one-eighth dioptre, one quarter dioptre, one-half dioptre, etc., which is a practical standard to use, as it brings the variation within limits that have been proven in the art and accepted for years, but of course even in these limits I use the best marginal conditions my group will disclose for the proposed shape surfaces.

Of course, with my graph I have an election as to the amount of marginal error I will select. I will select a shape surface to give the best astigmatic condition, within the maximum variation Alpha and will make a compromise on the astigmatism within the maximum variation Alpha to improve the focal variation. I can readily make my determination because the conditions are spread visibly before me on the graph.

Another decided advantage of my graph is that I can instantly see when to shift my shape surface to bring my marginal variation within the limits of variation I have selected, using one shape surface as long as I can for different powers, and then shifting to another, and so using it, etc. This reduces the tools necessary to make these lenses to a minimum; as for instance, in my toric series the factory will furnish 335 different blanks, and 58 tools, which will produce 947 different power lenses. As an example of using the same shape surface for many different power lenses, one of the shape surfaces in my series is used on a group of thirteen lenses, seven of which are negative and six of which are positive, and one of the surfaces for the second side in this group is used 96 different times throughout the range, six being negative and ninety positive, all of which is made possible by having before me my visible graph of the conditions existing throughout the range.

Some of the powers of lenses on which I can use a given shape surface will be in proximate series, while others will be scattered throughout different sections of the range. With my graph I can accurately locate all of these places within my limits of marginal error.

I also use the second side or power surfaces as many different times as possible, and it is in this way that my equipment is brought to a minimum, with maximum beneficial results.

The lens surfaces are produced in the usual prior art manner by spherical, cylindrical or toric laps and regular lens grinding and polishing machines, except that I put an exceedingly high, so-called pitch polish on them, and grind as accurately as possible to required shapes. The prescription optician can put on the second or power surfaces with the laps or tools supplied him by the lens manufacturer.

The method of operation of my process is as described above. I determine my shape surfaces from my graph, Figure 6, keeping in mind the oblique variations such shape surfaces will produce, and the use of this shape surface as many times as possible.

Then I finish the lens media, optical glass, to the shape surface, and then put on the second or power surface on the other side to get the required power, and use my power surface as many times as possible in the range. Where I do not finish the power surface I provide a set of laps or tools with the power surfaces on them so that the prescription optician can finish the blank to required power. All of my lenses so made will have the best possible oblique vision.

The calculations for the tangential and sagittal planes for marginal vision, as stated, are regular text book calculations, with the addition of the point of measurement being from the sphere 13 as described, all well understood by those skilled in lens calculations, and my graphs are made from these calculations as described above.

From the foregoing description it will be seen that I have provided means of producing lenses with controlled oblique errors that will produce a single lens of the best marginal vision, a commercial series of lenses with good marginal vision, with a minimum number of tools, and a process that will give visual determination of the best shape surfaces for any power, with best marginal vision, that will give visual determination of the minimum number of surfaces required to produce such lenses, that will give visual determination of the oblique variations for any power or range of power of lenses, that will insure speed in service, economy in equipment, and cost of production, and will give a pictorial view of all the controlling factors in the whole range of lenses to be produced.

Having described my invention, what I claim as new is:—

1. An ophthalmic lens having on one side thereof a shape curve lying between a shape curve for a lens of the required power having a maximum amount of marginal astigmatism of less than proximate lenses in the ophthalmic series vary from each other at a corresponding place in the series and a shape curve for the same lens having a maximum amount of marginal focal variation of less than proximate lenses in the ophthalmic series vary from each other at a corresponding place in the series, as determined from several different shape curves for a lens of equal power.

2. An ophthalmic lens having on one side thereof a shape curve lying between a shape curve for a lens of the required power having a maximum amount of marginal astigmatism of less than proximate lenses in the ophthalmic series vary from each other at a corresponding place in the series and a shape curve for the same lens having a maximum amount of marginal focal variation of less than proximate lenses in the ophthalmic series vary from each other at a corresponding place in the series, as determined from several different shape curves for a lens of equal power and a curve on the other side that will give the prescriptive power of the lens.

3. An ophthalmic lens having on one side thereof a shape curve lying between a shape curve having a marginal variation of astigmatism equal to the difference in power of proximate lenses of similar power in the ophthalmic series and a shape curve that has a marginal focal variation equal to the difference in power of proximate lenses of similar power in the ophthalmic series as determined from several different shape curves for a lens of equal power.

4. An ophthalmic lens having on one side thereof a shape curve lying between a shape curve having a marginal variation of astigmatism equal to the difference in power of proximate lenses of similar power in the ophthalmic series and a shape curve that has a marginal focal variation equal to the difference in power of proximate lenses of similar power in the ophthalmic series as determined from several different shape curves for a lens of equal power and a curve on the other side thereof that will give the required prescriptive power of the lens.

5. An ophthalmic lens having on one side thereof a shape curve lying between a shape curve having a marginal variation of astigmatism equal to the difference in power of proximate lenses of similar power in the ophthalmic series and a shape curve that has a marginal focal variation equal to the difference in power of proximate lenses of similar power in the ophthalmic series, and second shape curve having a marginal focal variation of less than the marginal focal variation of a lens of same power having no marginal variation of astigmatism, said curves being determined from several different shape curves for a lens of equal power.

6. An ophthalmic lens having on one side thereof a shape curve lying between a shape curve having a marginal variation of astigmatism equal to the difference in power of proximate lenses of similar power in the ophthalmic series and a shape curve that has a marginal focal variation equal to the difference in power of proximate lenses of similar power in the ophthalmic series, said second shape curve having a marginal focal variation of less than the marginal focal variation of a lens of same power having no marginal variation of astigmatism, said curves being determined from several different shape curves for a lens of equal power, and a curve on the other side that will give the required prescriptive power of the lens.

7. The process of making an ophthalmic lens comprising determining a shape curve of a lens of given power from several different shape curves for the lens of that power which shall have no variation of marginal astigmatism, determining therefrom a shape curve for a lens of that power that will have a marginal variation of astigmatism and a marginal focal variation of less than the difference in power of proximate lenses of similar power in the ophthalmic series, and placing said second shape curve on a piece of lens media.

8. The process of making an ophthalmic lens comprising determining a shape curve of a lens of given power from several different shape curves for the lens of that power which shall have no variation of marginal astigmatism, determining therefrom a shape curve for a lens of that power that will have a marginal variation of astigmatism and a marginal variation of focus of less than the difference in power of proximate lenses of similar power in the ophthalmic series, which said marginal focal variation is less than the marginal focal variation of a lens of same power of no marginal astigmatic variation, and placing said second shape curve on a piece of lens media.

9. The process of making an ophthalmic lens comprising determining a shape curve of lens of given power from several different shape curves for the lens of that power which shall have no variation of marginal astigmatism, determining therefrom a shape curve for a lens of that power that will have a marginal variation of astigmatism and a marginal focal variation of less than the difference in power of proximate lenses of same power in the ophthalmic series, placing said second shape curve on a piece of lens media, and placing on the second side a curve that will give the desired prescriptive power of the lens.

10. The process of making an ophthalmic lens comprising determining a shape curve of a lens of given power from several different shape curves for the lens of that power which shall have no variation of marginal astigmatism, determining therefrom a shape curve for a lens of that power that will have a marginal variation of astigmatism and a marginal variation of focus of less than the difference in power of proximate lenses of similar power in the ophthalmic series, which said marginal focal variation is less than the marginal focal variation of a lens of same power of no marginal astigmatic variation, placing said second shape curve on a piece of lens media, and placing on the second side a curve that will give the desired prescriptive power of the lens.

EDGAR D. TILLYER.